United States Patent [19]

Hsieh et al.

[11] Patent Number: 5,721,476
[45] Date of Patent: Feb. 24, 1998

[54] CONTROL CIRCUIT FOR LAMPS WITH A MELODY OUTPUT

[76] Inventors: Kuo-chin Hsieh, No. 147-1, Shuiyan Rd., Fengyuan City, Taichung Hsien; Chih-hai Su, No. 72-10, Chianan Li, Shanhua Chen, Tainan Hsien, both of Taiwan

[21] Appl. No.: 694,844

[22] Filed: Aug. 9, 1996

[51] Int. Cl.$^6$ ................................. H05B 37/02
[52] U.S. Cl. ............................ 315/76; 315/129; 315/133; 84/600; 84/647
[58] Field of Search ................ 84/600, 601, 602, 84/604, 647, 653, 662; 315/360, 76, 129, 133

[56] References Cited

U.S. PATENT DOCUMENTS

| | | |
|---|---|---|
| 1,690,279 | 11/1928 | Craft ........................... 315/76 |
| 3,598,889 | 8/1971 | Switsen ........................ 84/600 |
| 4,386,550 | 6/1983 | Newsome et al. ............ 84/647 |
| 4,537,109 | 8/1985 | Sakurai ........................ 84/653 |

*Primary Examiner*—Robert Pascal
*Assistant Examiner*—Michael B. Shingleton
*Attorney, Agent, or Firm*—Jones, Day, Reavis & Pogue

[57] ABSTRACT

A circuit arrangement for lamps with melody output includes a switch having a common end connected to an AC voltage source and three contact ends, two rectifiers each respectively connected to a contact end of the switch via a connector, a melody circuit for outputting an audio signal via a speaker, two timers each respectively connected between one of the rectifiers and the melody circuit for controlling the duration of the output audio signal, a lamp driving circuit connected to the melody circuit for receiving a lamp driving signal from the melody circuit, a lamp set connected to all of the contact ends of the switch, and a voltage regulation circuit connected to the AC voltage source via the connector for supplying a power signal to all of the electronic circuits.

4 Claims, 2 Drawing Sheets

CONTROL CIRCUIT FOR LAMPS WITH A MELODY OUTPUT

BACKGROUND OF THE INVENTION

The present invention relates to a control circuit for lamps, and particularly to a control circuit for lamps with a melody output.

In recent years, lamps in combination with a plurality of additional apparatuses have been widely used, such as, a lamp with a ceiling fan.

SUMMARY OF THE INVENTION

An objective of the present invention is to provide a control circuit for lamps with a melody output.

According to the present invention, a circuit arrangement for lamps with melody output includes a switch having a common end connected to an AC voltage source and three contact ends, two rectifiers each respectively connected to a contact end of the switch via a connector, a melody circuit for outputting an audio signal via a speaker, two timers each respectively connected between one of the rectifiers and the melody circuit for controlling the duration of the output audio signal, a lamp driving circuit connected to the melody circuit for receiving a lamp driving signal from the melody circuit, a lamp set connected to all of the contact ends of the switch via the connector, and a voltage regulation circuit connected to the AC voltage source via the connector for supplying a power signal to all of the electronic circuits.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
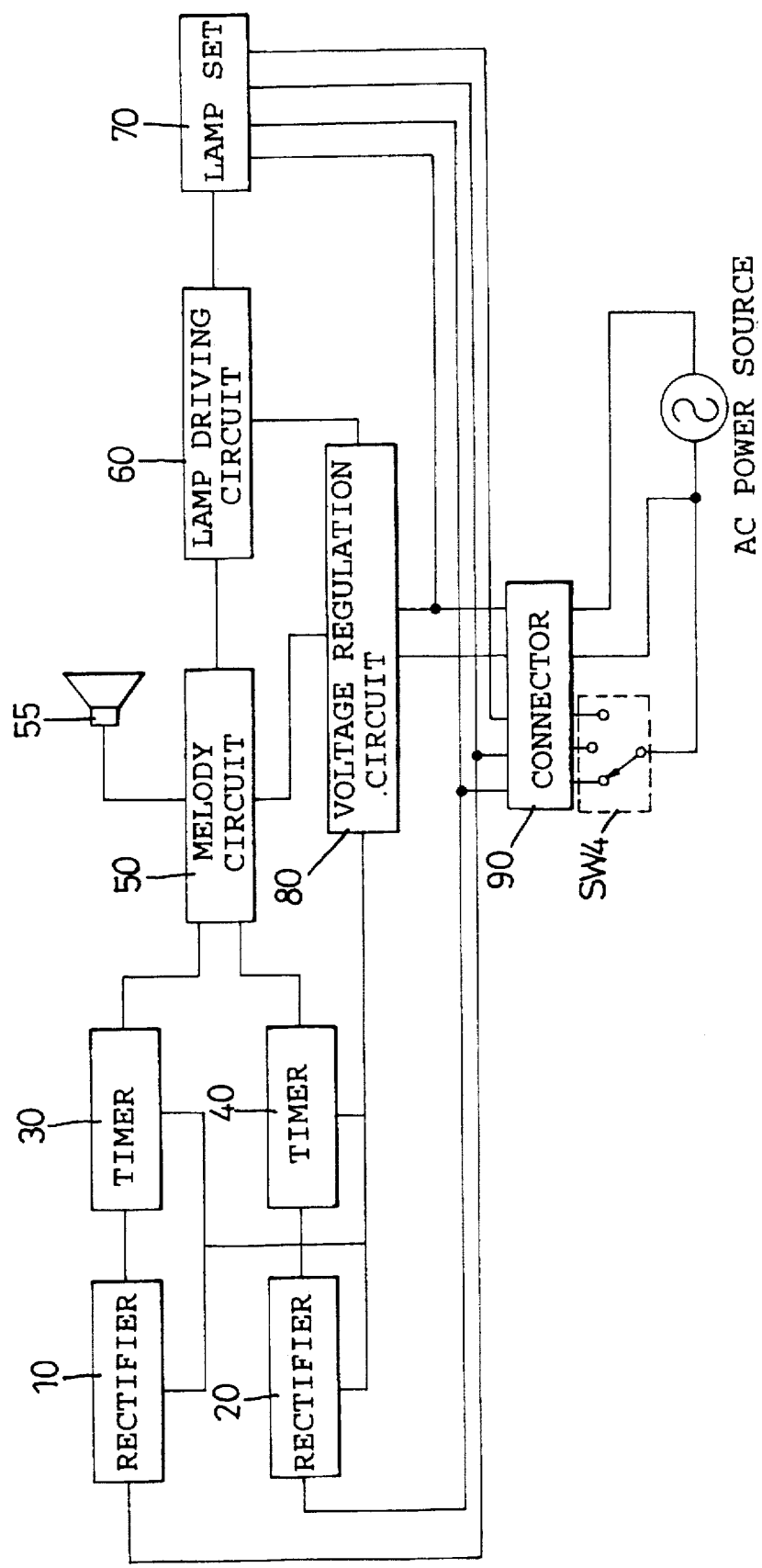
FIG. 1 is a block diagram of the control circuit of the present invention.

FIG. 1 illustrates a block diagram of a control circuit of the present invention. The control circuit includes a switch SW4 having a common end connected to an AC voltage source and three contact ends, two rectifiers 10, 20 each respectively connected to a contact end of the switch SW4 via a connector 90 and outputting a DC voltage signal, a melody circuit 50 for outputting an audio signal via a speaker 55, two timers 30, 40 respectively connected between the rectifiers 10, 20 and the melody circuit 50 for controlling the duration of the output audio signal, a lamp driving circuit 60 connected to the melody circuit 50 for receiving a lamp driving signal from the melody circuit 50, a lamp set 70 connected to all of the contact ends of the switch SW4 via the connector 90, and a voltage regulation circuit 80 connected to the AC voltage source via the connector 90 for supplying a power signal to all of the electronic circuits.

Figure 2:
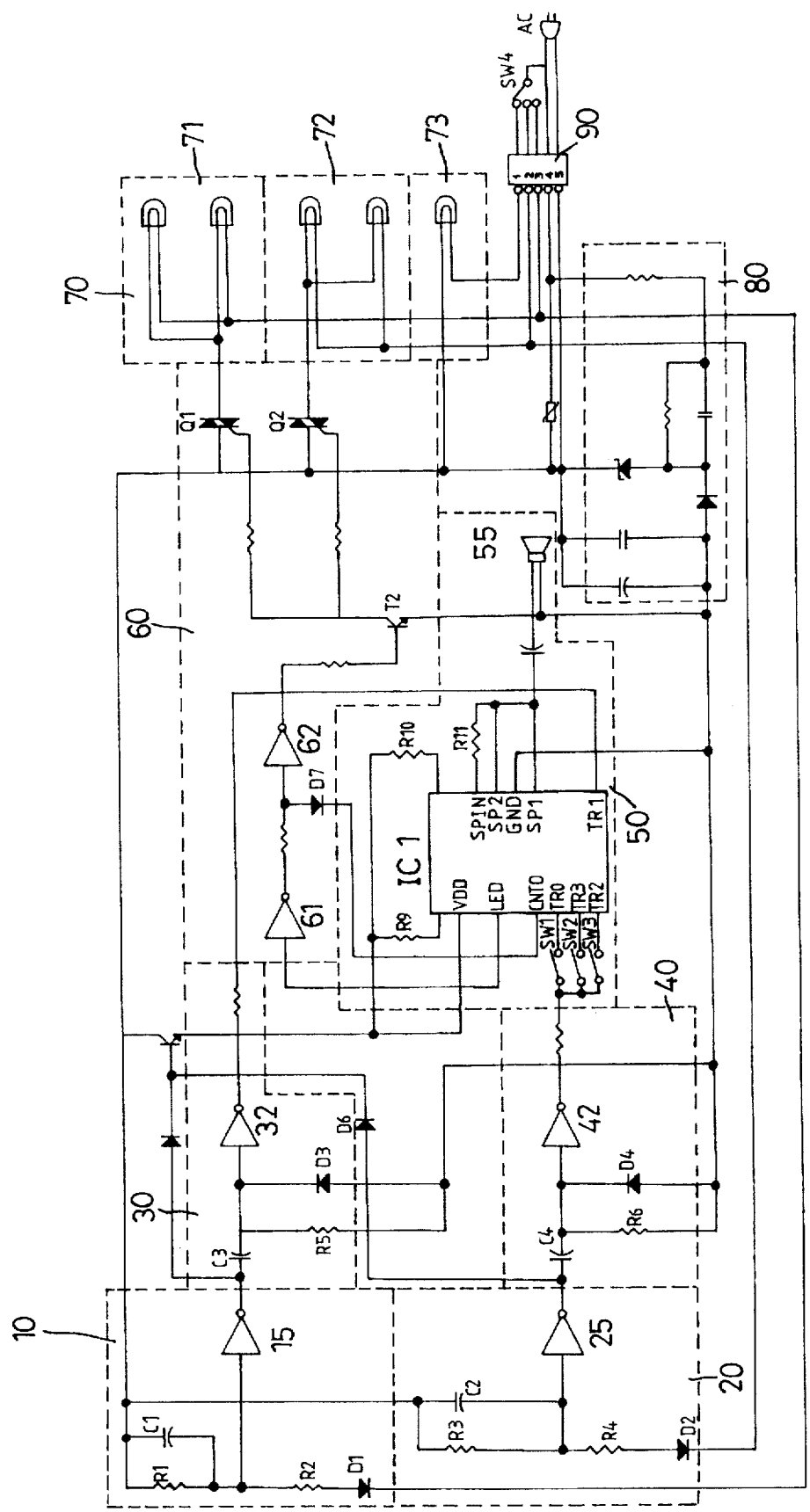
FIG. 2 is a circuit diagram of the circuit in FIG. 1.

Referring to FIG. 2, the rectifier 10 comprises a diode D1, two resistors R1, R2 connected in series to the diode D1, a capacitor C1 connected in parallel to the resistor R1, and an inverter 15. The rectifier 20 comprises a diode D2, two resistors R3, R4 connected in series to the diode D2, a capacitor C2 connected in parallel to the resistor R3, and an inverter 25. Inputs of the rectifiers 10, 20 are electrically connected to an AC power source via a connector 90, outputs of the inverters 15, 25 are connected to the timers 30, 40, respectively. The connector 90 has five pins 1–5 with the fourth pin connected to the AC source and the fifth pin connected to a ground. The timer 30 is composed of a capacitor C3 connected to the output of the inverter 15, a resistor R5 and a diode D3 connected in series to the capacitor C3, and an inverter 32 connected to the capacitor C3. The timer 40 is composed of a capacitor C4 connected to the output of the inverter 25, a resistor R6 and a diode D4 connected in series to the capacitor C4, and an inverter 42 connected to the capacitor C4. Outputs of the inverters 32, 42 are connected to the melody circuit 50 and capacitances of the capacitors C3, C4 will determine a duration of the melody output.

The melody circuit 50 is composed of a melody integrated circuit IC1 and three switches SW1–SW3. The melody integrated circuit IC1 comprises four triggering pins TR0–TR3, an LED pin, a SPIN pin, a SP1 and a SP2 pin. The integrated circuit IC1 has previously stored therein a plurality of audio signals, such as a lullaby, a chant, a nursery rhyme, or a fairy tale to be told. As shown, the switches SW1–SW3 are respectively connected between the triggering pins TR0, TR3, TR2 and the output of the inverter 42 for selecting a required set of melodies. The triggering pin TR1 is connected to the output of the inverter 32 for driving another set of melodies. The LED pin is connected to the lamp driving circuit 60. The SP1, SP2, and the SPIN pins are connected to the speaker 55.

The lamp driving circuit 60 is composed of two series-connected inverters 61, 62 connected to the LED pin of the integrated circuit IC1 for forming a buffer, a diode D7 connected between an output end of the inverter 61 and a CNTO pin of the IC1, a transistor T2, and two triacs Q1, Q2. The output of the inverter 62 is connected to a base of the transistor T2 having a grounded emitter and a collector connected to gates of the triacs Q1, Q2, each of which having a first anode electrically connected to the AC source via the 5th pin of the connector 90 and a second anode connected to the lamp set 70.

The lamp set 70 is composed of three lamp modules 71, 72, and 73. Each of the lamp modules 71, 72 comprise two lamps connected in parallel and have a first terminal connected to the second anodes of the triacs Q1, Q2 and a second terminal connected to the AC source via the second and third pins of the connector 90.

The first pin and the fifth pin of the connector 90 are respectively connected to the lamp module 73. The first, the second, and the third pins of the connector 90 are also respectively connected to the AC source via a switch SW4 with a common end connected to the AC source.

When the switch SW4 is connected to the first pin of the connector 90, the lamp module 73 is turned on while the lamp module 71, 72 and the melody circuit 50 is not operable.

When the switch SW4 is connected to the second pin of the connector 90, the lamp module 72 is activated. The timer 40 will receive a direct current from the rectifier 20 which is connected to the AC source via the second pin of the connector 90, then the timer 40 will activate the melody integrated circuit IC1 for a predetermined duration. The switches SW1–SW3 are used for determining the melody to be output. The LED pin of the integrated circuit IC1 will output a signal to activate the lamp module 72.

When the switch SW4 is connected to the third pin of the connector 90, the lamp module 71 is activated. The rectifier 10 will output a direct current to activate the timer 30 which will output a signal to the TR1 pin of the melody circuit 50 for outputting a predetermined melody. The LED pin will also output a signal to activate the lamp module 71.

From the above-mentioned arrangement, the lamp module 73 may preferably apply a higher power lamp than the lamps in the lamp modules 71, 72 such that the lamp 73 is for longterm illumination while the lamps in the lamp modules 71, 72 may flash in response to the melody output from the speaker 55.

Although the invention has been explained in relation to its preferred embodiment, it is to be understood that many other possible modifications and variations can be made without departing from the spirit and scope of the invention as hereinafter claimed.

I claim:

1. A circuit arrangement for lamps with melody output comprising:

a switch having a common end connected to an AC voltage source and three contact ends;

two rectifiers each respectively connected to a contact end of the switch via a connector;

a melody circuit for outputting an audio signal via a speaker;

two timers each respectively connected between one of the rectifiers and the melody circuit for controlling the duration of the output audio signal;

a lamp driving circuit connected to the melody circuit for receiving a lamp driving signal from the melody circuit;

a lamp set connected to all of the contact ends of the switch via the connector; and a voltage regulation circuit connected to the AC voltage source via the connector for supplying a power signal to the rectifiers, the timers, the melody circuit, the lamp driving circuit, and the lamp set.

2. The circuit arrangement as claimed in claim 1, wherein said lamp driving circuit is composed of two series-connected inverters connected to the melody circuit for forming a buffer, a transistor having a grounded emitter, a base connected to the output of the series-connected inverters, and two triacs each having a gate connected to a collector of the transistor, a first anode electrically connected to the AC voltage source via the connector, and a second anode connected to the lamp set.

3. The circuit arrangement as claimed in claim 1, wherein each of said timer is composed of a capacitor respectively connected to an output of one of the inverters for determining a duration of the melody output, a resistor and a diode connected in series to the capacitor, and an inverter connected to the capacitor.

4. The circuit arrangement as claimed in claim 1, wherein said lamp set comprises a first lamp module and a second lamp module each having two lamps connected in parallel and a first terminal connected to a respectively output of the lamp driving circuit and a second terminal connected to the AC voltage source and a third lamp module having a lamp with a power higher than each of the lamps in the first and the second lamp modules and connected to a contact end of the switch.

* * * * *